Patented Mar. 25, 1930

1,752,194

UNITED STATES PATENT OFFICE

JØRGEN ULRIK AHLMANN OHLSEN, OF COPENHAGEN, DENMARK

PROCESS OF PREPARING AN OXYCHLORIDE CEMENT

No Drawing. Application filed November 12, 1924, Serial No. 749,559, and in Denmark November 13, 1923.

My invention relates to a process enabling tight, dense and chemically indifferent bodies or articles of various kinds and shapes such as tubes, conduit elements, paving stones, bricks for building purposes or the like to be produced from materials containing diatomaceous earths, through a hydraulic binding process.

Articles produced by a hydraulic binding process, consisting in the formation of either simple or complex silicates, sulfates or chlorides, especially of alkaline earth metals, are as a rule porous and the porosity as a rule becomes increased when filling materials are used.

Attempts have been made in order to make articles produced from hydraulic materials dense and impervious by impregnating them with tar, bitumen or the like. These attempts however have not been successful, the impregnating means penetrating only slightly the most superficial layer of the article or remaining completely outside of it.

According to my present invention diatomaceous earths, kieselguhr, infusorial earths, or similar earths of biological origin of any source, presenting numerous regularly distributed microscopical cavities, are in a raw, dried or more or less baked or burned state brought to form impervious and dense bodies by a hydraulic binding process, the diatomic earths being used as filling materials in a suitable cement, such as cements of the Sorel type, for instance, magnesium oxychloride and similar compounds, which have the property to set or bind quickly with development of heat.

My invention is chiefly based upon the experiences that when saturating diatomic earths with suitable impregnating means in a melted or dissolved state a filling material is produced by the use of which articles may be produced by an hydraulic binding process in an impervious and dense state.

According to this invention the diatomaceous earths are mixed in a row or dried or more or less burned or baked state with natural or artificial asphalt, bitumen, resins or the like in a melted state or dissolved in mineral oils, tar or the like, or they are mixed with tar or the like alone, or with two or more impregnating means of the said kind. Preferably the quantities of the diatomaceous earths on the one hand and the impregnating means on the other hand are such that the former may completely adsorb the latter, so that the mixture which originally forms a pulp or magma, assumes thereby the character of a pulverulent and dry mass. However the quantity of the impregnating means used must be sufficient to transform all the diatomaceous earths.

The fresh mixture or the pulverulent mass formed by it, is in a suitable proportion, mixed with the hydraulic binding material or cement, with or without the addition of further filling materials such as asbestos, slag or the like, whereafter the mixture is moulded under pressure.

In order to have my invention fully understood I shall in the following, by way of example explain how it may be performed in practice.

Three parts of diatomaceous earths are impregnated with approximately one part of a melted or dissolved impregnating means of the kind above mentioned, whereby a pulverulent dry mass is formed. This mass is mixed with about one part of Sorel cement, magnesium oxychloride cement, or a similar compound, together with the necessary quantity of water, that is about one half part of water. About two parts of further filling materials of the kind above set forth, may be added. During or after the mixing operation the mass is moulded in suitable moulds by stamping or compressing or in another manner. I may employ pressure moulds, or moulding presses, brick presses or the like.

I do not confine myself to the above example. The kinds of the different materials and their quantities relative to each other may be varied in different manners without departing from the scope of the invention.

Having now particularly described and ascertained the nature of my said invention and in what manner the same is to be performed, I declare that what I claim is:

1. The process of preparing an oxychloride concrete which comprises mixing diatomaceous earth with liquefied bituminous materials normally solid, in quantity insufficient to change the powdery characteristics of the earth, and then mixing the resulting product with an oxychloride cement.

2. The process of preparing an oxychloride concrete which comprises mixing diatomaceous material with liquefied tarry materials normally solid, in quantity insufficient to change the powdery characteristics of the earth, and then mixing the resulting product with an oxychloride cement.

In testimony whereof I hereunto affix my signature.

JØRGEN ULRIK AHLMANN OHLSEN.